United States Patent
Shaw et al.

(10) Patent No.: US 11,292,063 B2
(45) Date of Patent: *Apr. 5, 2022

(54) APPARATUS AND METHODS FOR PRODUCTION ADDITIVE MANUFACTURING

(71) Applicant: General Electric Company, Schenectady, NY (US)

(72) Inventors: Mark Shaw, Loveland, OH (US); David Richard Barnhart, Jefferson, OH (US); Ronald Redden, Foster, KY (US); Theodore Anderson, Liberty Township, OH (US); Gregory Muster Morris, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,460

(22) Filed: Jun. 7, 2019

(65) Prior Publication Data
US 2019/0321889 A1    Oct. 24, 2019

Related U.S. Application Data
(63) Continuation of application No. 14/812,159, filed on Jul. 29, 2015, now Pat. No. 10,357,827.

(51) Int. Cl.
*B22F 12/00*    (2021.01)
*B29C 64/153*    (2017.01)
(Continued)

(52) U.S. Cl.
CPC .............. *B22F 12/00* (2021.01); *B22F 3/003* (2013.01); *B22F 3/1007* (2013.01); *B23K 26/21* (2015.10);
(Continued)

(58) Field of Classification Search
CPC .................................. B22F 12/00; B33Y 10/00
See application file for complete search history.

(56) References Cited

U.S. PATENT DOCUMENTS 5,387,380 A  *  2/1995  Cima .................... B29C 64/165
                                                              264/69
5,809,343 A  *  9/1998  Biondo .................. G03B 17/28
                                                              396/2
(Continued)

FOREIGN PATENT DOCUMENTS

CN         103635305 A       3/2014
DE     102007014968 A1      10/2008
(Continued)

OTHER PUBLICATIONS

European Office Action for application 16179869.9 dated Oct. 4, 2019 (5 pages).
(Continued)

*Primary Examiner* — Nicholas R Krasnow
(74) *Attorney, Agent, or Firm* — Dinsmore & Shohl LLP

(57) ABSTRACT

An additive manufacturing apparatus includes: a build module comprising a build chamber, and a least one of but less than all of the following elements: (a) a directed energy source; (b) a powder supply; (c) a powder recovery container; and (d) a powder applicator; and a workstation comprising the remainder of elements (a)-(d) not included in the build module.

10 Claims, 6 Drawing Sheets

(51) Int. Cl.
*B29C 64/25* (2017.01)
*B29C 64/321* (2017.01)
*B29C 64/364* (2017.01)
*B33Y 10/00* (2015.01)
*B33Y 30/00* (2015.01)
*B23K 26/21* (2014.01)
*B23K 26/342* (2014.01)
*B22F 3/00* (2021.01)
*B22F 3/10* (2006.01)
*B23K 37/00* (2006.01)
*B22F 10/10* (2021.01)
*B28B 1/00* (2006.01)
*B29K 105/00* (2006.01)

(52) U.S. Cl.
CPC .......... *B23K 26/342* (2015.10); *B23K 37/003* (2013.01); *B29C 64/153* (2017.08); *B29C 64/25* (2017.08); *B29C 64/321* (2017.08); *B29C 64/364* (2017.08); *B33Y 10/00* (2014.12); *B33Y 30/00* (2014.12); *B22F 10/10* (2021.01); *B28B 1/001* (2013.01); *B29K 2105/251* (2013.01); *Y02P 10/25* (2015.11)

(56) References Cited

U.S. PATENT DOCUMENTS

| | | | |
|---|---|---|---|
| 6,554,600 B1 | 4/2003 | Hofmann et al. | |
| 6,767,499 B1 | 7/2004 | Hory et al. | |
| 6,824,714 B1 | 11/2004 | Tuerck et al. | |
| 7,777,155 B2 | 8/2010 | Twelves, Jr. et al. | |
| 8,070,474 B2 | 12/2011 | Abe et al. | |
| 8,550,802 B2 | 10/2013 | Fuwa et al. | |
| 8,568,124 B2 | 10/2013 | Brunermer | |
| 9,456,884 B2 | 10/2016 | Uckelmann et al. | |
| 9,908,293 B2* | 3/2018 | Yoo | B33Y 40/00 |
| 10,357,827 B2* | 7/2019 | Shaw | B23K 37/003 |
| 2004/0035314 A1 | 2/2004 | Muchalov | |
| 2004/0035542 A1* | 2/2004 | Ederer | B29C 64/153 164/45 |
| 2004/0084814 A1 | 5/2004 | Boyd et al. | |
| 2005/0116391 A1 | 6/2005 | Lindemann et al. | |
| 2005/0263934 A1 | 12/2005 | Chung et al. | |
| 2005/0274661 A1 | 12/2005 | Jackson | |
| 2005/0280185 A1* | 12/2005 | Russell | B28B 7/465 264/308 |
| 2006/0108712 A1 | 5/2006 | Mattes | |
| 2007/0026145 A1 | 2/2007 | Lindemann et al. | |
| 2007/0057412 A1* | 3/2007 | Weiskopf | B33Y 10/00 264/497 |
| 2008/0190905 A1 | 8/2008 | Heinlein | |
| 2010/0155985 A1 | 6/2010 | McAlea et al. | |
| 2011/0135952 A1 | 6/2011 | Morris et al. | |
| 2013/0108726 A1 | 5/2013 | Uckelmann et al. | |
| 2014/0065194 A1* | 3/2014 | Yoo | B29C 64/165 424/400 |
| 2015/0017271 A1 | 1/2015 | Donaldson et al. | |
| 2015/0224718 A1* | 8/2015 | Ederer | B29C 64/141 264/308 |
| 2015/0336330 A1 | 11/2015 | Herzog | |
| 2016/0067779 A1 | 3/2016 | Dautova et al. | |
| 2016/0200084 A1* | 7/2016 | Hays | B29C 64/236 156/62.2 |
| 2016/0214327 A1 | 7/2016 | Uckelmann et al. | |
| 2016/0243618 A1 | 8/2016 | Heugel et al. | |
| 2017/0151723 A1* | 6/2017 | Yoo | B29C 64/106 |
| 2018/0079133 A1* | 3/2018 | Ederer | B33Y 10/00 |
| 2018/0141275 A1* | 5/2018 | Patel | B33Y 30/00 |
| 2019/0047218 A1* | 2/2019 | Ederer | B29C 64/245 |

FOREIGN PATENT DOCUMENTS

| | | |
|---|---|---|
| DE | 102012014841 A1 | 1/2014 |
| DE | 102013000511 A1 | 7/2014 |
| EP | 1600282 A1 | 11/2005 |
| EP | 1961514 A2 | 8/2008 |
| JP | 2002/503632 A | 2/2002 |
| JP | 2002/527613 A | 8/2002 |
| JP | 2003/507224 A | 2/2003 |
| JP | 2005/089863 A | 4/2005 |
| JP | 2005/335392 A | 12/2005 |
| JP | 2014/513637 A | 6/2014 |
| WO | WO2008116627 A1 | 10/2008 |
| WO | WO2014/176538 A1 | 10/2014 |
| WO | WO2015/071183 A1 | 5/2015 |
| WO | WO2015108551 A1 | 7/2015 |

OTHER PUBLICATIONS

European Office Action for application 16179869.9 dated Feb. 20, 2020 (4 pages).
Canadian Office Action Corresponding to CA Application No. 2936668 dated Jan. 29, 2018.
Canadian Office Action Corresponding to CA Application No. 2936668 dated Oct. 4, 2018.
Chinese Office Action Corresponding to CN Application No. 2016106096789 dated Apr. 25, 2018.
Chinese Office Action Corresponding to CN Application No. 2016106096789 dated Dec. 5, 2018.
Chinese Office Action Corresponding to CN Application No. 2016106096789 dated Jun. 4, 2019.
Partial European Search Report Corresponding to Application No. EP16179869 dated Nov. 17, 2016.
European Search Report Corresponding to Application No. EP16179869 dated Nov. 24, 2016.
European Search Report Corresponding to Application No. EP16179869 dated Feb. 23, 2017.
European Search Report and Opinion issued in connection with corresponding EP Application No. 161798699 dated Mar. 2, 2017.
Notification Reasons for Refusal Issued in Connection with Corresponding JP Application No. 2016-139865 dated Oct. 31, 2017.
Sachs et al., Toward Manufacturing of Fine Components by 3D Printing, In the Solid Freeform Fabrication Symposium Proceedings, 2000, pp. 190-199.

* cited by examiner

APPARATUS AND METHODS FOR PRODUCTION ADDITIVE MANUFACTURING

CROSS-REFERENCE TO RELATED APPLICATIONS

This application is a continuation of U.S. patent application Ser. No. 14/812,159, filed Jul. 29, 2015, titled "APPARATUS AND METHODS FOR PRODUCTION ADDITIVE MANUFACTURING," the entirety of which is hereby incorporated by reference.

BACKGROUND OF THE INVENTION

This invention relates generally to an additive manufacturing apparatus and more particularly to an apparatus for mass production of components.

"Additive manufacturing" is a term used herein to describe a process which involves layer-by-layer construction or additive fabrication (as opposed to material removal as with conventional machining processes). Such processes may also be referred to as "rapid manufacturing processes". Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Sterolithography (SLA), Electron Beam Melting (EBM), Laser Engineered Net Shaping (LENS), and Direct Metal Deposition (DMD).

Currently, powder bed technologies have demonstrated the best resolution capabilities of prior art metal additive manufacturing technologies. However, since the build needs to take place in the powder bed, conventional machines use a large amount of powder, for example a powder load can be over 130 kg (300 lbs.). This is costly when considering a factory environment using many machines. The powder that is not directly melted into the part but stored in the neighboring powder bed is problematic because it adds weight to the elevator systems, complicates seals and chamber pressure problems, is detrimental to part retrieval at the end of the part build, and becomes unmanageable in large bed systems currently being considered for large components.

Furthermore, currently available additive manufacturing systems are geared for prototyping and very low volume manufacturing. Considerable differences can exist from part-to-part. Some elements of current systems are cumbersome to handle due to weight and can require excessive manual, hands-on interaction. Duplication of multiple machines in parallel to manufacturing multiple parts results in expensive duplication of components and services such as controls and cooling and environmental controls.

Accordingly, there remains a need for an additive manufacturing apparatus and method that can produce components on a mass-production basis.

BRIEF SUMMARY OF THE INVENTION

This need is addressed by the technology described herein, which provides additive manufacturing apparatus utilizing one or more simplified build modules in combination with one or more common components being centrally provided or shared amongst the build modules.

According to one aspect of the technology described herein an additive manufacturing apparatus includes: a build module having a build chamber, and a least one of but less than all of the following elements: (a) a directed energy source; (b) a powder supply; (c) a powder recovery container; and (d) a powder applicator; and a workstation having the remainder of elements (a)-(d) not included in the build module.

According to another aspect of the technology described herein, an additive manufacturing apparatus includes: a workstation including a directed energy source; a build module, including: a first build chamber; and a peripheral wall extending past the worksurface opposite the first build chamber to define a workspace; and a transport mechanism operable to move the build module into and out of the workstation.

According to another aspect of the technology described herein, an additive manufacturing method includes: moving a build module having a build chamber into a workstation; depositing powder onto a build platform which is disposed in the build chamber; directing a beam from a directed energy source to fuse the powder; moving the platform vertically downward within the build chamber by a layer increment of powder; and repeating in a cycle the steps of depositing, directing, and moving to build up the part in a layer-by-layer fashion until the part is complete

BRIEF DESCRIPTION OF THE DRAWINGS

The invention may be best understood by reference to the following description taken in conjunction with the accompanying drawing figures, in which.

DETAILED DESCRIPTION OF THE INVENTION

In general, aspects of the technology described herein provide an additive manufacturing apparatus and method in which multiple build modules are used in an assembly-line process. The individual build modules are simplified compared to prior art additive machines and may be configured to include only the components needed to manufacture a specific part or selected group of parts, with common components being centrally provided or shared amongst the build modules.

Figure 1:
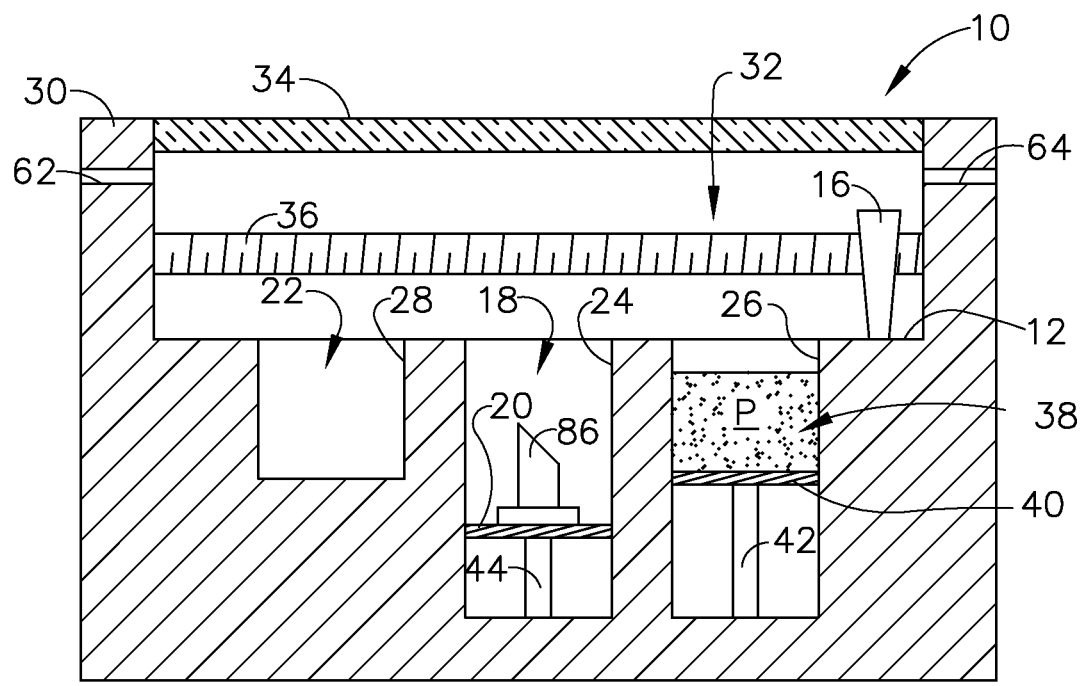
FIG. 1 is a cross-sectional view of an additive manufacturing build module constructed according to an aspect of the technology described herein.
Figure 2:
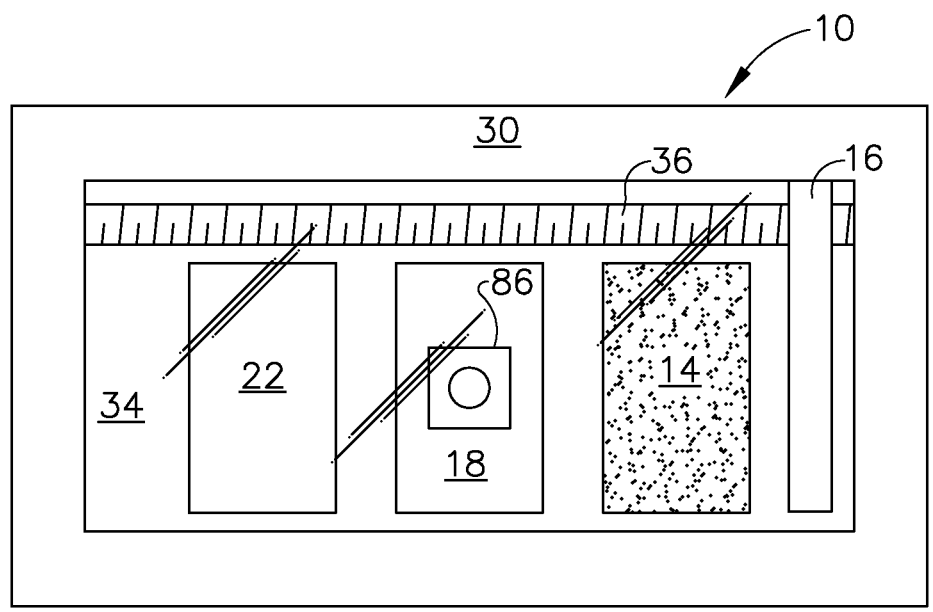
FIG. 2 is a top plan view of the build module of FIG. 1.

Now, referring to the drawings wherein identical reference numerals denote the same elements throughout the various views, FIGS. 1 and 2 illustrate an exemplary additive manufacturing build module 10 for carrying out a manufacturing method according to one aspect of the technology described herein. The build module 10 incorporates a worksurface 12, a powder supply 14, an applicator 16, a build chamber 18 surrounding a build platform 20, and a powder recovery container 22. Each of these components will be described in more detail below.

Figure 6:
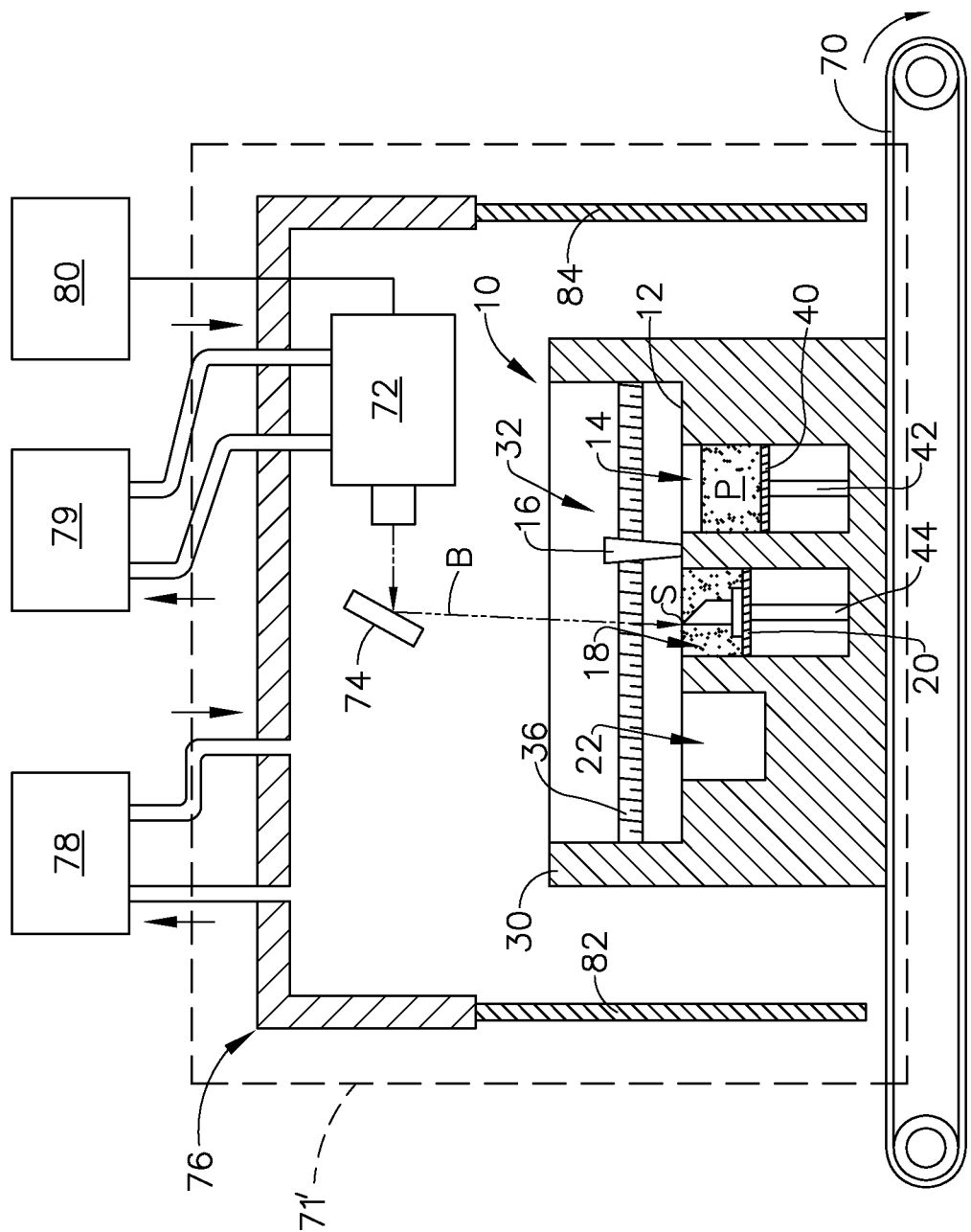
FIG. 6 is a schematic side view of an alternative build module in an assembly line.

The worksurface 12 is a rigid structure and is coplanar with and defines a virtual workplane. In the illustrated example, it includes a build chamber opening 24 communicating with the build chamber 18, a supply opening 26 communicating with the powder supply 14, and a recovery opening 28 communicating with the powder recovery container 22. The module 10 includes a peripheral wall 30 extending past the worksurface 12 so as to define a workspace 32. The worksurface 12 is surrounded by the peripheral wall 30 of the build module 10. Optionally, as shown in FIG. 1, the workspace 32 is closed off by a removable or openable window 34 that is transparent to radiant energy, for example, the window 34 could be made of glass. As shown in FIG. 6, the window 34 may be eliminated depending on the desired process configuration.

The applicator 16 is a rigid, laterally-elongated structure that lies on or contacts the worksurface 12 and is moveable in the workspace 32 positioned above the worksurface 12. It is connected to an actuator 36 operable to selectively move the applicator 16 parallel to the worksurface 12. The actuator 36 is depicted schematically in FIG. 1, with the understanding devices such as pneumatic or hydraulic cylinders, ballscrew or linear electric actuators, and so forth, may be used for this purpose. As depicted, the applicator 16 moves from right to left to move powder from the powder supply 14 to the build chamber 18 with excess powder being moved to the powder recovery container 22. It should be appreciated that the powder supply 14 and powder recovery container 22 may be reversed and the applicator 16 may move from left to right to supply powder from the powder supply 14 to the build chamber 18.

The powder supply 14 comprises a supply container 38 underlying and communicating with supply opening 26, and an elevator 40. The elevator 40 is a plate-like structure that is vertically slidable within the supply container 38. It is connected to an actuator 42 operable to selectively move the elevator 40 up or down. The actuator 42 is depicted schematically in FIG. 1, with the understanding that devices such as pneumatic or hydraulic cylinders, ballscrew or linear electric actuators, and so forth, may be used for this purpose. When the elevator 40 is lowered, a supply of powder "P" of a desired alloy composition may be loaded into the supply container 38. When the elevator 40 is raised, it exposes the powder P above the worksurface 12 to allow the applicator 16 to scrape the exposed powder into the build chamber 18. It should be appreciated that the powder used in the technology described herein may be of any suitable material for additive manufacturing. For example, the powder may be a metallic, polymeric, organic, or ceramic powder.

The build platform 20 is a plate-like structure that is vertically slidable in the build chamber 18 below the opening 24. The build platform 20 is secured to an actuator 44 that is operable to selectively move the build platform 20 up or down. The actuator 44 is depicted schematically in FIG. 1, with the understanding that devices such as pneumatic or hydraulic cylinders, ballscrew or linear electric actuators, and so forth, may be used for this purpose.

The powder recovery container 22 underlies and communicates with the recovery opening 28, and serves as a repository for excess powder P.

Figure 3:
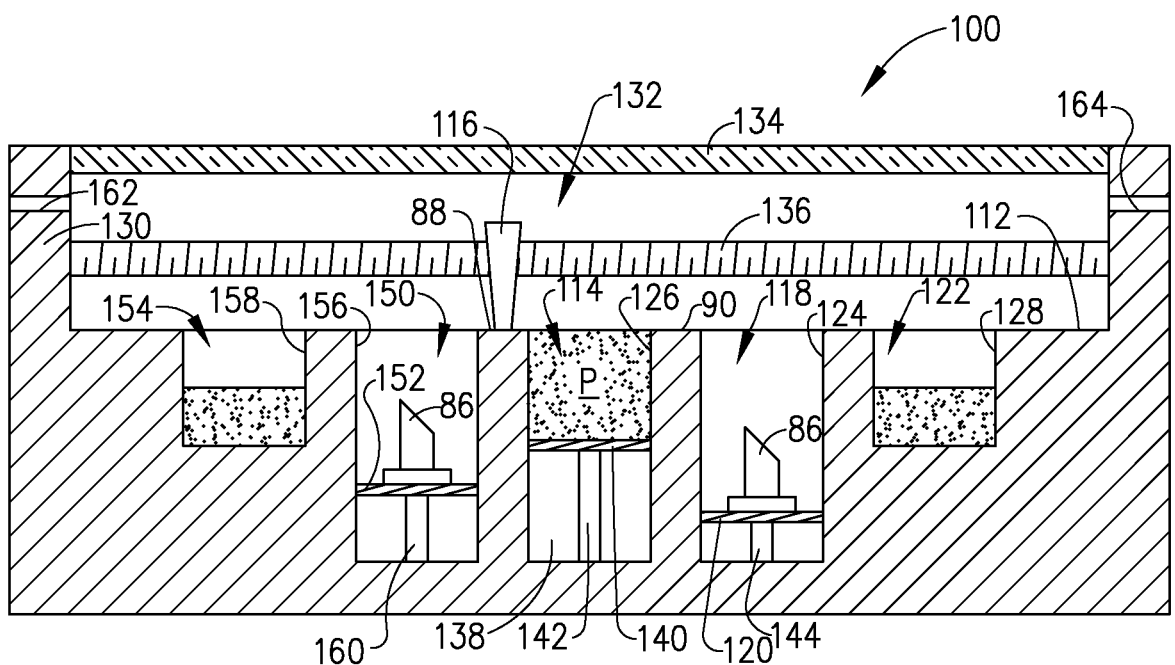
FIG. 3 is a cross-sectional view of an alternative additive manufacturing build module.
Figure 4:
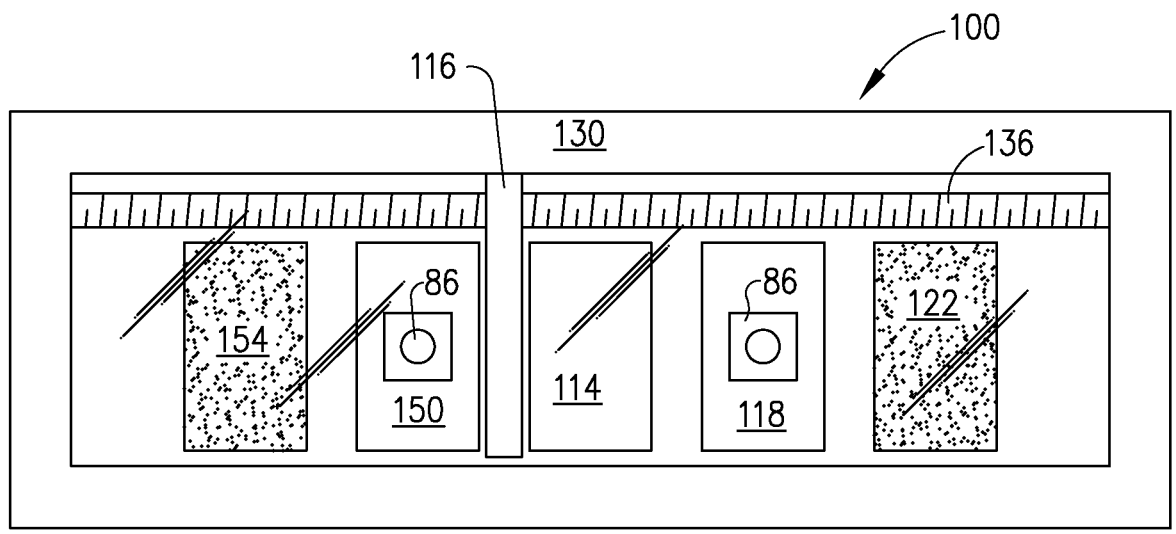
FIG. 4 is a top plan view of the build module of FIG. 3.

The build module 10 may be implemented in different configurations. For example, build module 100, FIGS. 3-4, includes a worksurface 112, a powder supply 114, an applicator 116, a first build chamber 118 surrounding a first build platform 120, a second build chamber 150 surrounding a second build platform 152, a first powder recovery container 122, and a second powder recovery container 154.

The worksurface 112 is a rigid structure and is coplanar with and defines a virtual workplane. In the illustrated example, it includes a first build chamber opening 124 communicating with the build chamber 118, a second build chamber opening 156 communicating with the build chamber 150, a central supply opening 126 communicating with the powder supply 114, a first recovery opening 128 communicating with the first powder recovery container 122, and a second recovery opening 158 communicating with the second powder recovery container 154. The module 100 includes a peripheral wall 130 extending past the worksurface 112 so as to define a workspace 132. The worksurface 112 is surrounded by the peripheral wall 130 of the build module 100. Optionally, as shown in FIG. 1, the workspace 132 may be closed off by a removable or openable window 134 that is transparent to radiant energy, for example, the window 134 could be made of glass. As discussed above, depending on the desired setup, the window 134 may be eliminated.

The applicator 116 is a rigid, laterally-elongated structure that lies on the worksurface 112 and is moveable in the workspace 132 positioned above the worksurface 112. It is connected to an actuator 136 operable to selectively move the applicator 116 along the worksurface 112. The actuator 136 is depicted schematically in FIG. 3, with the understanding devices such as pneumatic or hydraulic cylinders, ballscrew or linear electric actuators, and so forth, may be used for this purpose. The applicator 116 operates in like fashion to applicator 16 except that applicator 116 moves right from a first starting location 88 to move powder from powder supply 114 to build chamber 118 and moves left from a second starting location 90 to move powder from powder supply 114 to build chamber 150.

The powder supply 114 comprises a supply container 138 underlying and communicating with supply opening 126, and an elevator 140. The elevator 140 is a plate-like structure that is vertically slidable within the supply container 138. It is connected to an actuator 142 operable to selectively move the elevator 140 up or down. The actuator 142 is depicted schematically in FIG. 3, with the understanding that devices such as pneumatic or hydraulic cylinders, ballscrew or linear electric actuators, and so forth, may be used for this purpose. When the elevator 140 is lowered, a supply of powder "P" of a desired alloy composition may be loaded into the supply container 138. When the elevator 140 is raised, it exposes the powder P above the worksurface 112. It should be appreciated that the powder used in the technology described herein may be of any suitable material for additive manufacturing. For example, the powder may be a metallic, polymeric, organic, or ceramic powder.

Build platforms 120 and 152 are plate-like structures that are vertically slidable in build enclosures 118 and 150, respectively, below openings 124 and 156. The build platforms 120 and 152 are secured to actuators 144 and 160 that are operable to selectively move the build platforms 120 and 152 up or down. The actuators 144 and 160 are depicted schematically in FIG. 3, with the understanding that devices such as pneumatic or hydraulic cylinders, ballscrew or linear electric actuators, and so forth, may be used for this purpose.

The powder recovery containers 122 and 154 underlie and communicate with overflow openings 128 and 158, respectively, and serve as a repository for excess powder P.

Build module 10 and build module 100 may each include a respective gas port 62, 162 and a respective vacuum port 64, 164 extending through the peripheral wall 30, 130. The gas ports 62, 162 allow workspaces 32 and 132 to be purged with an appropriate shielding gas while the vacuum ports 64, 164 allow the workspaces 32 and 132 to be cleared of loose powder contained in the volume of the workspaces 32 and 132. This ensures that the workspaces 32 and 132 and windows 34 and 134 remain clean during operation.

Figure 5:
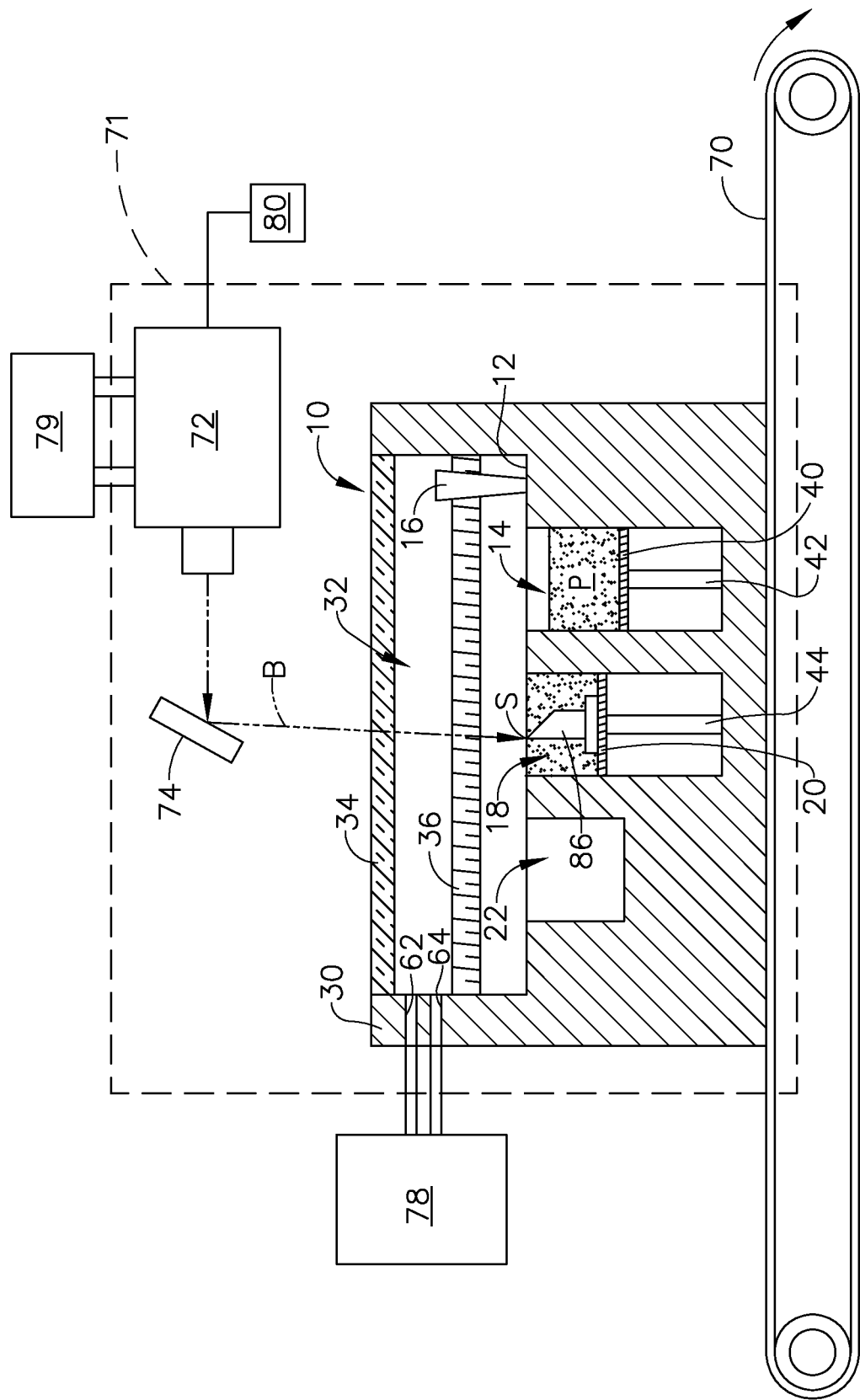
FIG. 5 is a schematic side view of the build module of FIG. 1 in an assembly line.
Figure 7:
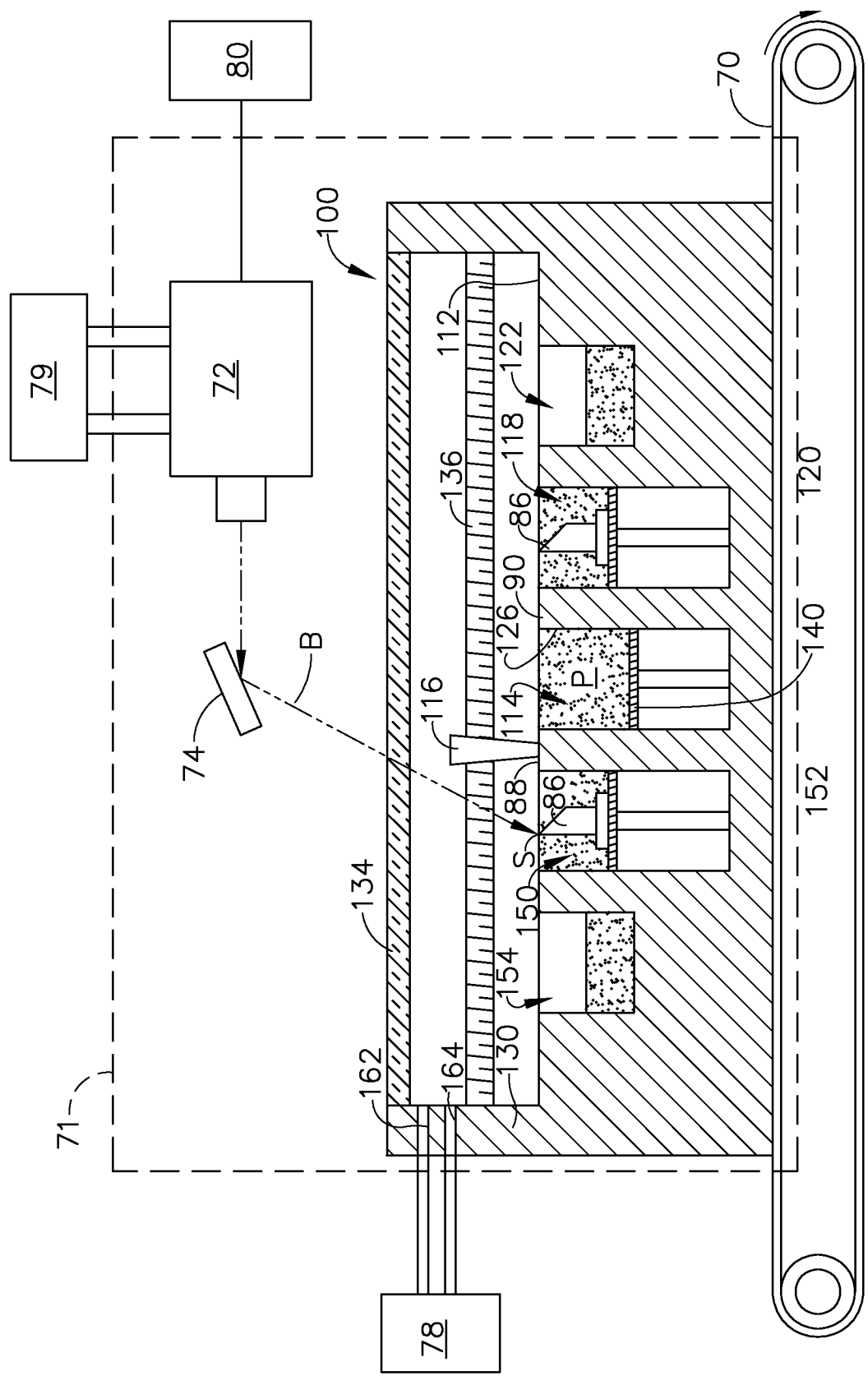
FIG. 7 is a schematic side view of the build module of FIG. 3 in an assembly line.

As illustrated in FIGS. 5-7, the build modules 10 and 100 are configured to produce a single part or a limited number of parts in a small package, such that the build modules 10 and 100 may be easily lifted and placed on a conveyor 70 or other suitable transport mechanism, thus allowing a plurality of build modules to be positioned in an assembly line to manufacture a plurality of parts in sequence. In operation the conveyor 70 is used to move the build modules into a workstation 71. As illustrated in FIG. 5, the workstation 71 may be defined as a physical location within the overall additive manufacturing system. At the workstation 71, a directed energy source 72 positioned above the conveyor 70 may be used to melt powder P and form a part 86.

The directed energy source 72 may comprise any device operable to generate a beam of suitable power and other operating characteristics to melt and fuse the powder during the build process, described in more detail below. For example, the directed energy source 72 may be a laser. Other directed-energy sources such as electron beam guns are suitable alternatives to a laser.

A beam steering apparatus 74 is used to direct the energy source and comprises one or more mirrors, prisms, and/or lenses and provided with suitable actuators, and arranged so that a beam "B" from the directed energy source 72 can be focused to a desired spot size and steered to a desired position in an X-Y plane coincident with the worksurface 12, 112.

In cases where windows 34 and 134 are employed, the workstation 71 may be an open area, as seen in FIGS. 5 and 7. This is possible because the build modules 10, 100 are completely enclosed and include the gas and vacuum ports described above.

The overall system may include one or more central services, such as a central ventilation system 78 to supply shielding gas and/or forced ventilation to shield the build process and purge powder entrained in the build enclosure 76, a central cooling system 79 to provide cooling fluid to the directed energy source 72, and/or an electronic central controller 80 to provide control for the build process, for example by driving the directed energy source 72 and various functions of the workstation 71 and/or build module 10. The central services 78, 79, 80 may be coupled to multiple workstations 71 as part of an overall production system. The individual connections to central services may be made manually or using automated connection devices when the build modules 10, 100 are moved into place in the workstation 71.

Alternatively, if the build modules 10, 100 are employed without windows 34, 134, the conveyor 70 may be used to transport the build modules 10, 100 into a workstation 71' having a build enclosure 76 which provides a closed environment. The build enclosure 76 may include sealing elements 82, 84 (e.g. curtains, flaps, or doors) to allow the build modules 10, 100 to pass therethrough and seal off the build enclosure 76 once the build module 10, 100 has entered or exited the build enclosure 76. The central services described above (e.g. central ventilation system 78, central cooling system 79, and/or central controller 80) would be coupled to the enclosure 76.

For purposes of clarity, only build module 10 will be discussed below. It should be appreciated that while the build module 100 is of a different configuration than build module 10, the build process for build module 100 is essentially the same process except for the movement of the applicator 116 (which moves from center to right and center to left with the center position being a starting position) and the fact that more than one build chamber is being utilized to form multiple parts in a single build module.

The build process for a part 86 using the build module 10 described above is as follows. The build module 10 is prepared by loading the powder supply 14 with powder P. This is done by lowering the elevator 40 using actuator 42 to a position below the worksurface 12 and loading enough powder P onto the elevator 40 to build part 86. Once the build module 10 is prepared, the build module 10 is positioned on conveyor 70 for transport to the directed energy source 72. Because the build module 10 is a self-contained unit and is easily moved onto and off of the conveyor 70, multiple build modules may be positioned onto the conveyor 70 to provide an assembly line of build modules.

Once the conveyor 70 has transported the build module 10 to the directed energy source 72, FIGS. 5-6, the build process may begin. The build platform 20 is moved to an initial high position. The initial high position is located below the worksurface 12 by a selected layer increment. The layer increment affects the speed of the additive manufacturing process and the resolution of the part 86. As an example, the layer increment may be about 10 to 50 micrometers (0.0003 to 0.002 in.). Powder "P" is then deposited over the build platform 20. For example, the elevator 40 of the supply container 38 may be raised to push powder through the supply opening 26, exposing it above the worksurface 12. The applicator 16 is moved across the worksurface 12 to spread the raised powder P horizontally over the build platform 20. Any excess powder P is pushed along the worksurface 12 and dropped into powder recovery container 22 as the applicator 16 passes from right to left. It should be appreciated that the configuration of the build module 10 may be reversed, i.e., by switching the locations of the powder supply 14 and powder recovery container 22. Subsequently, the applicator 16 may be retracted back to a starting position.

For build module 100, build platforms 120 and 152 are moved to the initial high position and the elevator 140 is raised to push powder through supply opening 126. Applicator 116 moves from the first central position 88 across the worksurface 112 to spread powder P horizontally over the build platform 120 with excess powder P deposited in powder recovery container 122. Applicator 116 is moved to the second central position 90, elevator 140 is raised to push powder P through supply opening 126, and applicator 116 moves across worksurface 112 to spread the powder P over the build platform 152 with excess powder deposited in powder recovery container 154. Applicator is moved back to the first central position 88. The steps described below with respect to build platform 20 also apply to build platforms 120 and 152.

The directed energy source 72 is used to melt a two-dimensional cross-section or layer of the part 86 being built. The directed energy source 72 emits a beam "B" and the beam steering apparatus 74 is used to steer the focal spot "S" of the beam B over the exposed powder surface in an appropriate pattern. The exposed layer of the powder P is heated by the beam B to a temperature allowing it to melt, flow, and consolidate. This step may be referred to as fusing the powder P.

The build platform 20 is moved vertically downward by the layer increment, and another layer of powder P is applied in a similar thickness. The directed energy source 72 again emits a beam B and the beam steering apparatus 74 is used to steer the focal spot S of the beam B over the exposed powder surface in an appropriate pattern. The exposed layer of the powder P is heated by the beam B to a temperature allowing it to melt, flow, and consolidate both within the top layer and with the lower, previously-solidified layer.

This cycle of moving the build platform 20, applying powder P, and then directed energy melting the powder P is repeated until the entire part 86 is complete.

Once the part 86 is complete, the conveyor 70 moves the build module 10 away from the directed energy source 72 to allow a user to remove the build module 10 from the conveyor 70, remove the part 86 from the build module 10, and prepare the build module 10 to build another part 86. It should be appreciated that multiple build modules may be placed on the conveyor 70 so that when one part 86 is complete, the conveyor moves another build module 10 into position to complete another part 86.

Figure 8:
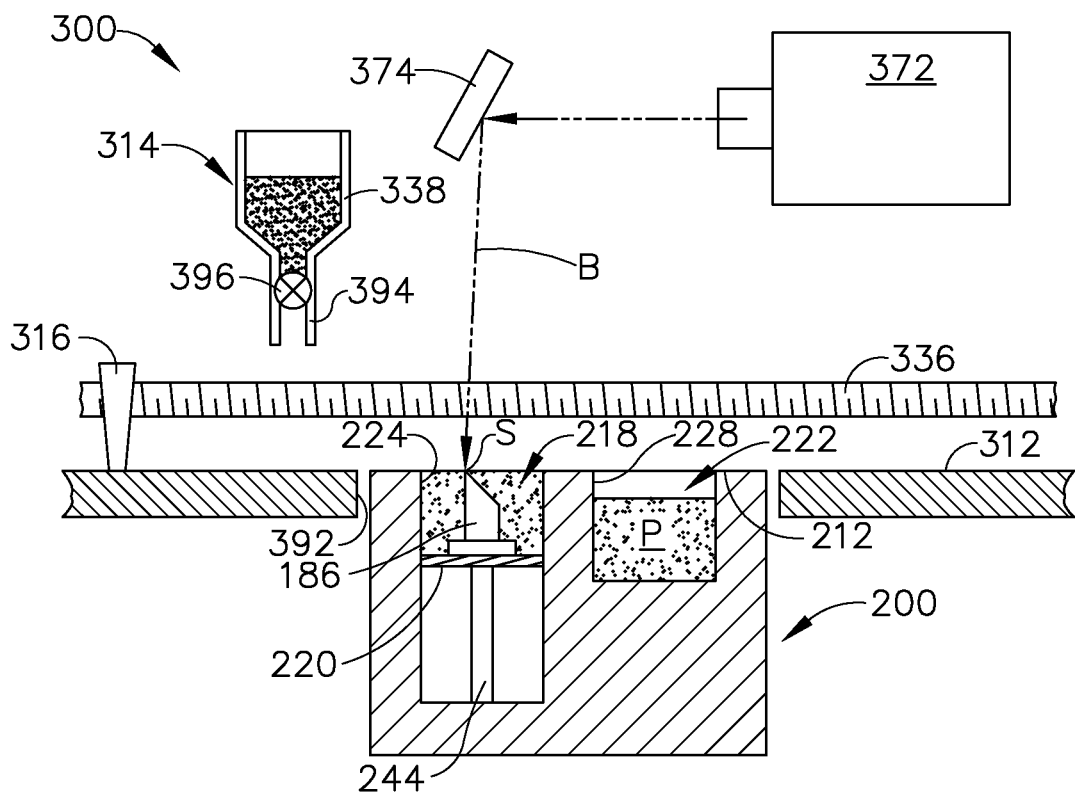
FIG. 8 is a cross-sectional view of an alternative additive manufacturing build module.

An alternative build module is illustrated in FIG. 8 and shown generally at reference numeral 200. Build module 200 represents another configuration of build module 10. Build module 200 includes a worksurface 212, a build chamber 218 surrounding a build platform 220, and a powder recovery container 222.

As discussed above with respect to build module 10, the worksurface 212 is a rigid structure and is coplanar with and defines a virtual workplane. In the illustrated example, it includes a build chamber opening 224 for communicating with the build chamber 218 and exposing the build platform 220 and a recovery opening 228 communicating with the powder recovery container 222.

The build platform 220 is a plate-like structure that is vertically slidable in the build chamber 218 below the opening 224. The build platform 220 is secured to an actuator 244 that is operable to selectively move the build platform 220 up or down. The actuator 244 is depicted schematically in FIG. 8, with the understanding that devices such as pneumatic or hydraulic cylinders, ballscrew or linear electric actuators, and so forth, may be used for this purpose.

The powder recovery container 222 underlies and communicates with the recovery opening 228, and serves as a repository for excess powder P.

Figure 9:
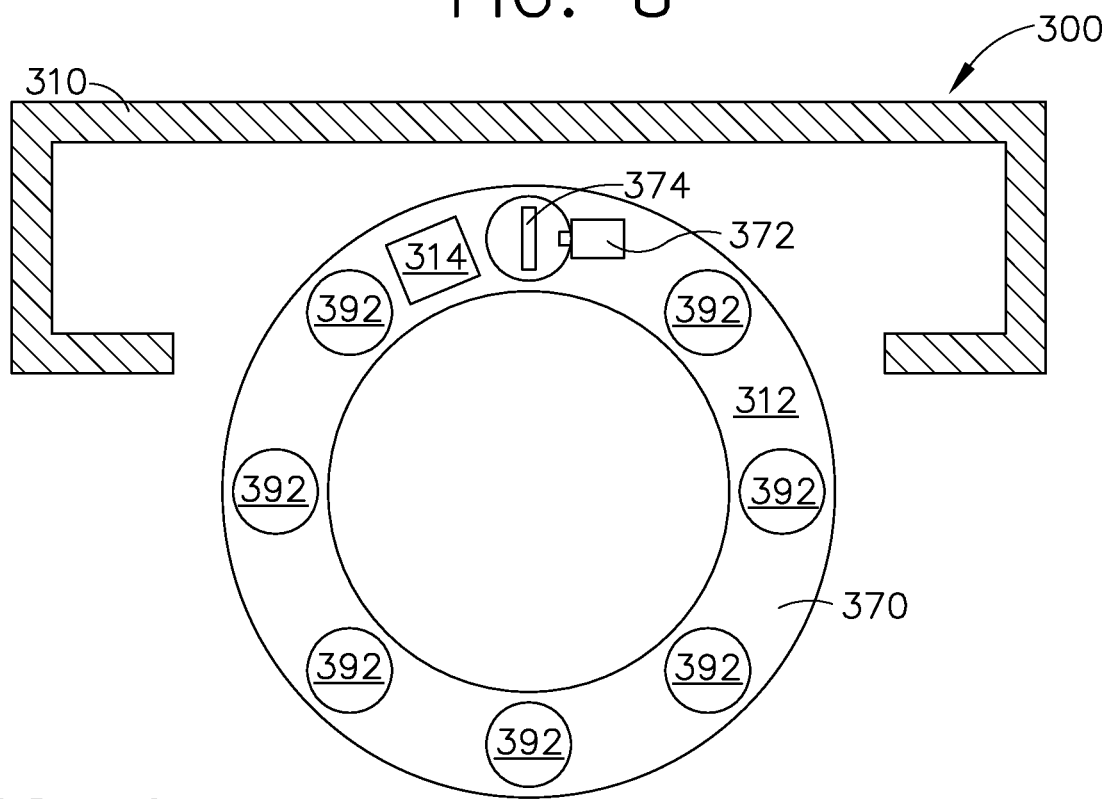
FIG. 9 is a schematic top plan view of the build module of FIG. 8 in a rotary assembly center.

The build module 200 is designed to work with an additive manufacturing apparatus 300, FIGS. 8 and 9, having a build enclosure 310 and a rotary turntable 370. The build enclosure 310 houses a powder supply 314, an applicator 316, a directed energy source 372, and a beam steering apparatus 374. The build enclosure 310 encloses a portion of the rotary turntable 370.

The rotary turntable 370 incorporates a worksurface 312 that provides a rigid structure and is coplanar with worksurface 212 to define a virtual workplane. In the illustrated example, it includes a plurality of build module openings 392 spaced around the rotary turntable 370 for permitting a build module 200 to be positioned by a user in each of the plurality of build module openings 392. The rotary turntable 370 may be rotated using known methods such as gears, motors, and other suitable methods.

The powder supply 314 comprises a supply container 338 in the form of a hopper having a narrow spout 394 for dropping powder P onto the worksurface 312. A metering valve 396 is positioned in the narrow spout 394 and is configured to drop a pre-determined amount of powder P. The amount of powder P dropped by the metering valve 396 is based on the size of the build platform 220 and a layer increment (described above with reference to build module 10) used during a build process.

The applicator 316 is a rigid, laterally-elongated structure that lies on and traverses worksurfaces 212 and 312. It is connected to an actuator 336 operable to selectively move the applicator 316 along the worksurfaces. The actuator 336 is depicted schematically in FIG. 8, with the understanding devices such as pneumatic or hydraulic cylinders, ballscrew or linear electric actuators, and so forth, may be used for this purpose. As depicted, the applicator 316 moves from left to right to move powder from the powder supply 314 to the build chamber 218 with excess powder being moved to the powder recovery container 222. It should be appreciated that the configuration of the powder supply 314, directed energy source 372, build chamber 218, and powder recover container 222 may be reversed and the applicator 316 may move from right to left to supply powder from the powder supply 314 to the build chamber 218.

The directed energy source 372 may comprise any known device operable to generate a beam of suitable power and other operating characteristics to melt and fuse the powder during the build process, described in more detail below. For example, the directed energy source 372 may be a laser. Other directed-energy sources such as electron beam guns are suitable alternatives to a laser. The beam steering apparatus 374 is used to direct the energy source and comprises one or more mirrors, prisms, and/or lenses and provided with suitable actuators, and arranged so that a beam "B" from the directed energy source 372 can be focused to a desired spot size and steered to a desired position in an X-Y plane coincident with the worksurface 212, 312.

The build process for a part 186 begins by positioning a build module 200 into one of the plurality of build module openings 392. Multiple build modules may be positioned on the rotary turntable 370 by positioning a build module 200 in each build module opening 392. As illustrated, the rotary turntable 370 includes eight build module openings 392. It should be appreciated that the number of build module openings may be changed based on the size and application of the rotary turntable 370.

With the build module 200 positioned in the build module opening 392, the rotary turntable 370 is rotated to position the build module 200 in a build position, FIG. 8, so as to allow the applicator 316, powder supply 314, and directed energy source 372 to form the part 186. As discussed above, the build platform 220 is moved to an initial high position. The initial high position is located below the worksurface 212 by a selected layer increment. The metering valve 396 of the powder supply 314 is actuated to drop a pre-determined amount of powder P from the powder supply 314 onto the worksurface 312. The applicator 316 is moved across the worksurface 312 and the worksurface 212 to spread the dropped powder P horizontally over the build platform 220. Any excess powder P is pushed along the worksurface 212 and dropped into powder recovery container 222. The applicator 316 may be moved back to its initial position.

The directed energy source 372 is used to melt a two-dimensional cross-section or layer of the part 186 being built. The directed energy source 372 emits a beam "B" and the beam steering apparatus 374 is used to steer the focal spot "S" of the beam B over the exposed powder surface in an appropriate pattern. The exposed layer of the powder P is heated by the beam B to a temperature allowing it to melt, flow, and consolidate. This step may be referred to as fusing the powder P.

The build platform 220 is moved vertically downward by the layer increment, and another layer of powder P is applied in a similar thickness. The directed energy source 372 again emits a beam B and the beam steering apparatus 374 is used to steer the focal spot S of the beam B over the exposed powder surface in an appropriate pattern. The exposed layer of the powder P is heated by the beam B to a temperature allowing it to melt, flow, and consolidate both within the top layer and with the lower, previously-solidified layer.

This cycle of moving the build platform 220, applying powder P, and then directed energy melting the powder P is repeated until the entire part 186 is complete.

Once the part 186 is complete, the rotary turntable 370 rotates to move the build module 200 away from the directed energy source 372 to allow a user to remove the build module 200 from the rotary turntable 370 and replace it with another build module 200. The part 186 is removed from the build module 200 and the build module 200 may be prepared to build another part 186. It should be appreciated that multiple build modules may be placed on the rotary turntable 370 so that when one part 186 is complete, the rotary turntable 370 rotates another build module 200 into position to complete another part 186.

The additive manufacturing apparatus and method described above has several advantages over the prior art. It is compatible with a closed powder handling system, eliminates the need for a large open powder reservoir to make multiple parts, and saves significant labor in handling excess powder after a build cycle.

The foregoing has described an additive manufacturing apparatus and method. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. An additive manufacturing system, comprising:
a plurality of build modules, respective ones of the plurality of build modules comprising:
a build chamber,
a powder recovery chamber, and
a worksurface;
a workstation comprising:
a directed energy source,
a powder supply,
a powder applicator, and
a build enclosure housing the directed energy source and configured to receive a build module; and
a transport mechanism configured to transport respective ones of the plurality of build modules into the build enclosure, wherein the transport mechanism includes a transport mechanism-worksurface, the transport mechanism-worksurface being coplanar with the build-module worksurface so as to define a virtual workplane.

2. The additive manufacturing system of claim 1, wherein the build enclosure encloses only a portion of the transport mechanism.

3. The additive manufacturing system of claim 1, wherein the transport mechanism allows respective ones of the plurality of build modules to be positioned in an assembly line.

4. The additive manufacturing system of claim 1, wherein the transport mechanism is operable to move respective ones of the plurality of build modules into the build enclosure of the workstation in sequence.

5. The additive manufacturing system of claim 1, wherein the transport mechanism comprises a plurality of build module openings, respective ones of the plurality of build module openings configured to receive respective ones of the plurality of build modules.

6. The additive manufacturing system of claim 1, comprising the plurality of build modules positioned on the transport mechanism.

7. An additive manufacturing system, comprising:
a build module comprising:
a build chamber,
a powder recovery chamber, and
a worksurface including a build chamber opening communicating with the build chamber and a powder recovery opening communicating with the powder recovery chamber;
a workstation comprising:
a directed energy source, and
a build enclosure housing the directed energy source and configured to receive a build module below the directed energy source;
a powder supply positioned in either the build module or in the build enclosure;
a powder applicator configured to move powder across the worksurface from the powder supply, across the build chamber opening, and to the powder recovery opening; and
a transport mechanism configured to move a build module to a position within the build enclosure such that the build chamber is below the directed energy source, wherein the transport mechanism includes a transport mechanism-worksurface, the transport mechanism-worksurface being coplanar with the worksurface so as to define a virtual workplane.

8. The additive manufacturing system of claim 7, wherein the transport mechanism includes a rotary turntable having a plurality of build module openings therein for receiving a plurality of the build modules and for rotating the plurality of build modules sequentially into position below the directed energy source.

9. The additive manufacturing system of claim 8, wherein the powder supply is positioned in the build enclosure for supplying powder to each of the plurality of build modules from above the worksurface.

10. The additive manufacturing system of claim 9, wherein the powder applicator is positioned in the build enclosure for moving powder across the worksurface of each of the plurality of build modules.

* * * * *